Feb. 13, 1951     C. G. PREIS     2,541,097
FISH CANNING MACHINE
Filed Sept. 7, 1945     3 Sheets-Sheet 1

INVENTOR.
Carl G. Preis
BY Ivan D. Thornburgh
Charles H. Erne
ATTORNEYS

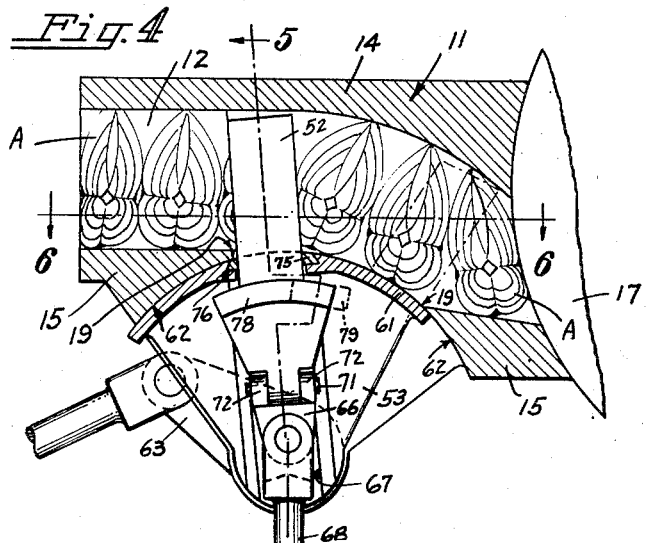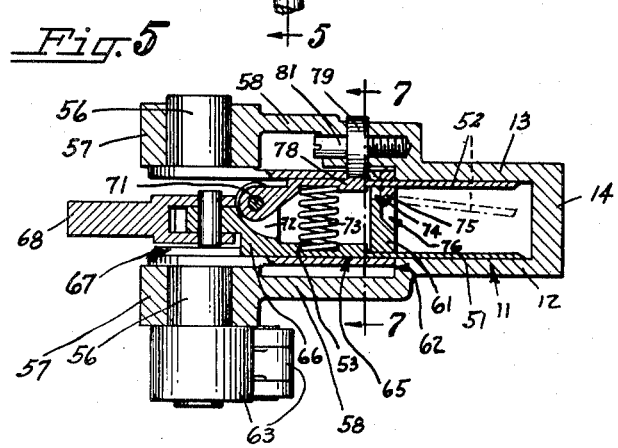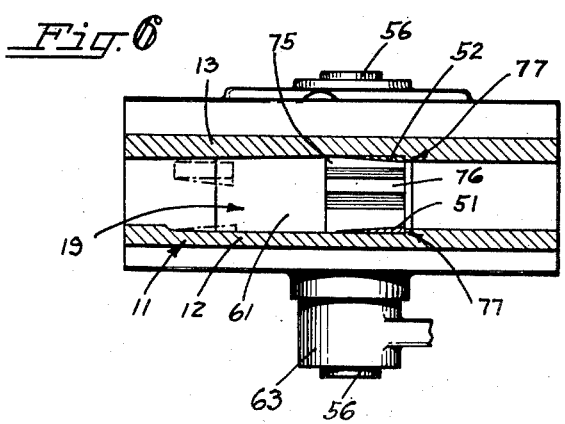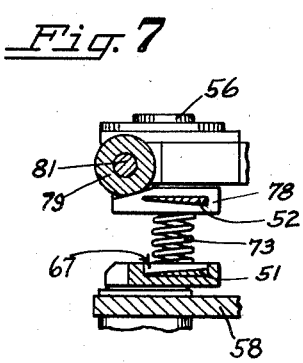

Feb. 13, 1951     C. G. PREIS     2,541,097
FISH CANNING MACHINE
Filed Sept. 7, 1945     3 Sheets-Sheet 3
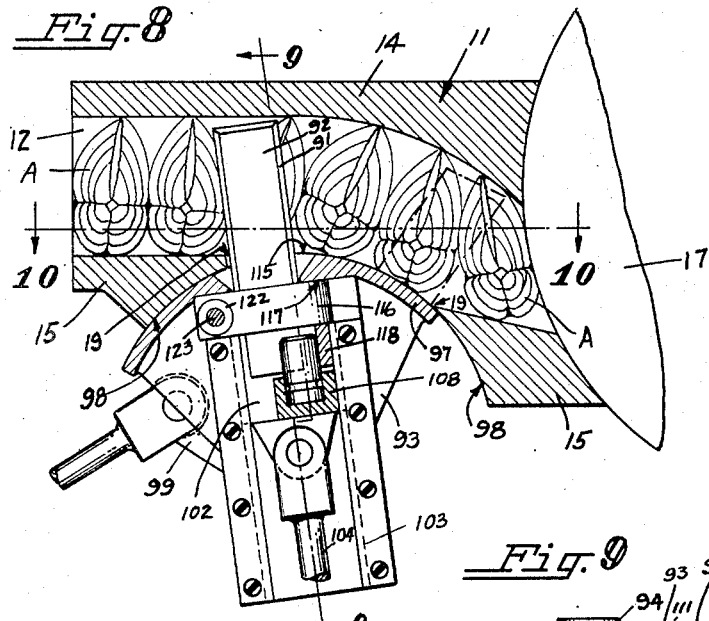
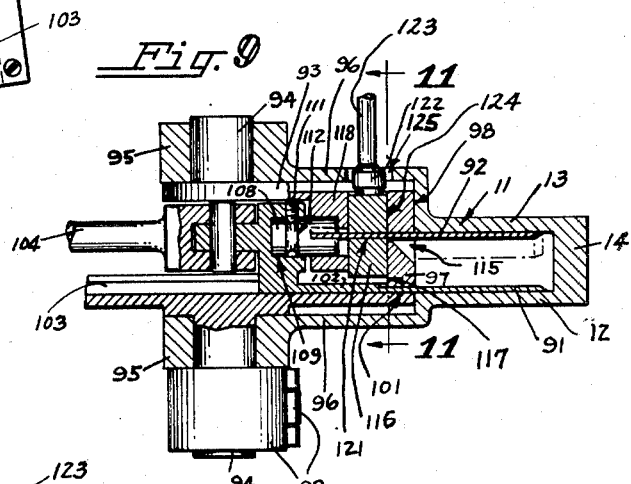
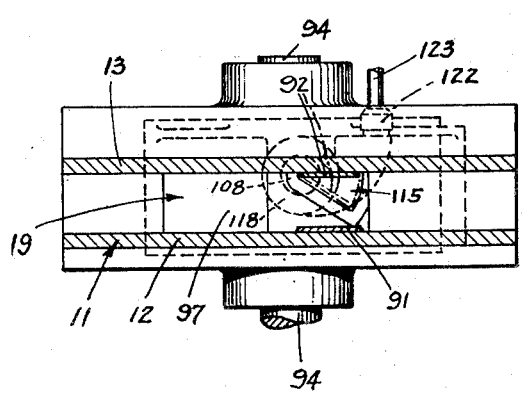
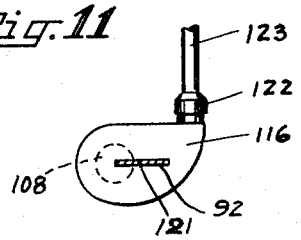
INVENTOR.
Carl G. Preis
BY Ivan D. Thornburgh
Charles H. Erne
ATTORNEYS Patented Feb. 13, 1951

2,541,097

UNITED STATES PATENT OFFICE 2,541,097

FISH CANNING MACHINE

Carl G. Preis, Forest Hills, N. Y., assignor to American Can Company, New York, N. Y., a corporation of New Jersey Application September 7, 1945, Serial No. 614,959

13 Claims. (Cl. 198—218)

1

The present invention relates to a fish canning machine of the type having a supply tunnel in which pre-cut pieces of fish are collected preparatory to canning and has particular reference to improved devices for advancing the collected fish through the tunnel toward the canning mechanism.

An object of the invention is the provision in a fish canning machine of feeding devices for advancing collected fish pieces through a supply tunnel wherein the fish mass is engaged on opposite sides thereof and propelled through the tunnel rapidly and gently, with the least disturbance to the individual fish pieces, in order to produce first grade packing at high speed rates of production.

Another object is the provision of such devices which include oppositely disposed paddles wherein the paddles engage the fish mass on opposite sides thereof and in such a manner as to wedge the fish between the paddles for advancement through the tunnel rapidly and gently so that breaking or other damage to the fish will be prevented.

Numerous other objects and advantages of the invention will be apparent as it is better understood from the following description, which, taken in connection with the accompanying drawings, discloses a preferred embodiment thereof.

Referring to the drawings:

Fig. 4 is a sectional plan view of a modified form of the devices shown in Fig. 1, with parts broken away;

Figs. 5 and 6 are sectional views taken substantially along the respective lines 5—5, 6—6 in Fig. 4 with the fish removed;

Fig. 7 is a sectional detail taken substantially along the line 7—7 in Fig. 5, with parts broken away;

Fig. 8 is a sectional plan view of a second modified form of the devices shown in Fig. 1, with parts broken away;

Figs. 9 and 10 are sectional views taken substantially along the respective lines 9—9, 10—10 in Fig. 8 with the fish removed; and Fig. 11 is a sectional detail taken substantially along the line 11—11 in Fig. 9, with parts broken away.

As a preferred embodiment of the invention the drawings illustrate improved feeding devices for advancing pre-cut pieces of fish A preparatory to canning, through a supply tunnel 11 of a fish canning machine of the type disclosed in United States Patent 2,044,813, issued June 23, 1936 to W. E. Rooney on Fish Canning Machine.

The supply tunnel 11 (Figs. 1, 2 and 3) in general is a fully enclosed tubular member of rectangular cross-section, having a floor 12, a roof 13, and a pair of side walls 14, 15 spaced apart sufficiently to accommodate one piece of fish. The fish pieces A are introduced individually into this tunnel in any suitable manner, such as that disclosed in the above mentioned Rooney patent, to produce a uniform fish mass which serves as the supply from which the fish is taken in measured charges by a measuring and canning mechanism indicated generally at 17, for packing into cans.

Figure 3:
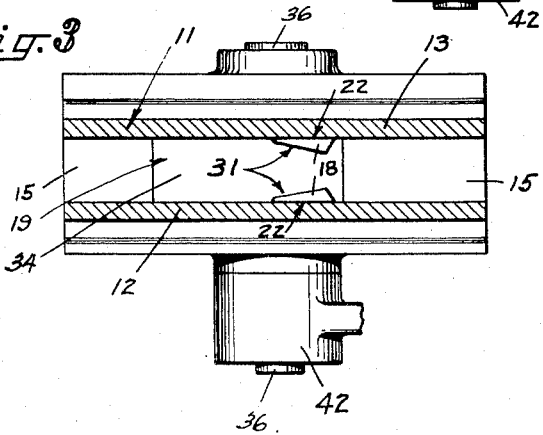
Fig. 3 is a section taken substantially along the line 3—3 in Fig. 2.

The fish mass in the tunnel 11 is intermittently advanced therethrough toward the measuring mechanism 17 by a pair of spaced and parallel solid blades or paddles 18 which are insertable into the tunnel on opposite sides of the fish mass therein, through an opening 19 formed in the side wall 15 of the tunnel. The paddles are wedge shaped in cross section as best shown in Fig. 3.

The outer surfaces 22 of the paddles 18 are straight and flat and operate against the inner surfaces of the floor 12 and roof 13 of the tunnel. At their outer ends, exteriorly of the tunnel, the paddles 18 are formed integrally with a cross bar 25 (Fig. 2) which is pivotally connected to an actuating link 26. This link is actuated in any suitable manner in time with the other moving parts of the machine, preferably as disclosed in the above mentioned Rooney patent, for inserting the paddles 18 into the tunnel and for withdrawing them therefrom, as will be hereinafter explained.

The paddles 18 are carried in and slidably operate in a pair of wedge shaped slots 31 (Figs. 1 and 2) formed in a short rocker pin or member 32 mounted in a bearing 33 formed in and located adjacent the outer periphery of a curved outer wall section 34 of an oscillatory tumbler 35. The tumbler is formed with a pair of trunnions 36 carried in bearings 37 in a pair of support legs 38 which extend out from the tunnel floor 12 and from its roof 13. This tumbler is disposed adjacent the tunnel 11 with its outer curved wall section 34 slidably engaging against a curved seat 41 formed in the tunnel side wall 15 and surrounding the opening 19 therein. The tumbler seals the opening against the escape of the fish pieces therethrough.

The tumbler 35 is oscillated in its seat 41 through a forward or feeding stroke and thence through a return stroke by a lever arm 42 which is mounted on one of the tumbler trunnions 36. Actuation of the lever arm is effected in any suitable manner in time with the other moving parts of the machine, preferably as disclosed in the above mentioned Rooney patent.

Figure 1:
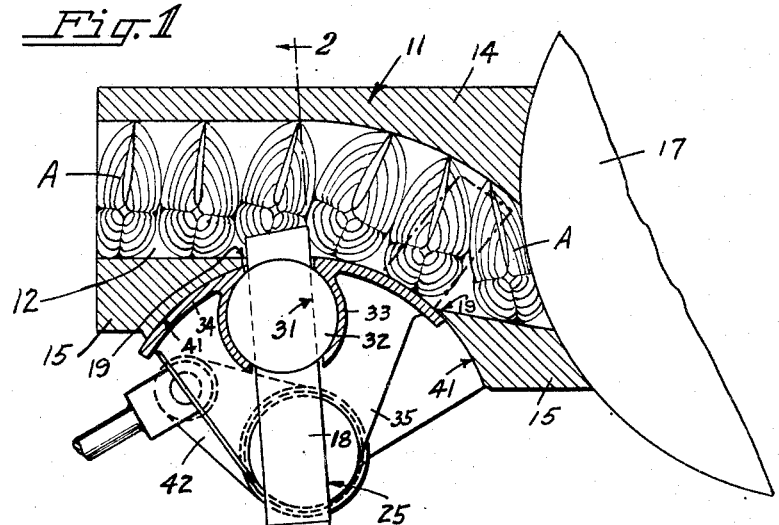
Figure 1 is a sectional plan view of a portion of a fish canning machine embodying the instant invention, with parts broken away.
Figure 2:
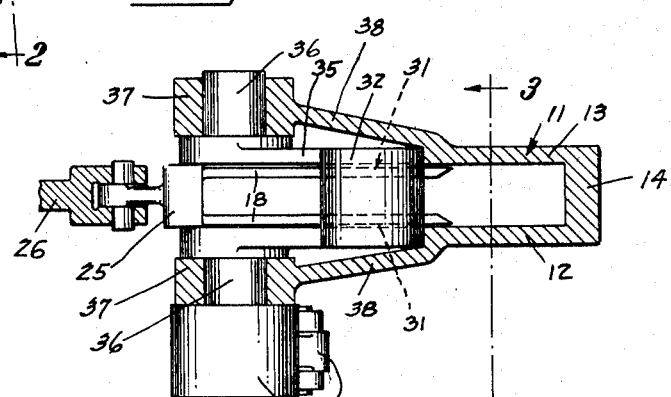
Fig. 2 is a transverse section taken substantially along the line 2—2 in Fig. 1 with the fish removed.

Normally the paddles 18 are in a retracted position within the tumbler 35, the inner ends of the paddles being disposed just inside the outer periphery of the curved wall section 34 of the tumbler. In operation the paddles 18 simultaneously are projected inwardly into the tunnel 11 while the tumbler remains stationary in its position, as shown in Fig. 1. The inwardly moving paddles travel along the inner surfaces of the floor 12 and roof 13 of the tunnel and push their way between the tunnel walls and the fish mass in the tunnel. This fish mass is thus confined between the wedge shaped paddles, there being one paddle on each side of the fish.

While in this position within the tunnel 11 the paddles 18 with the tumbler 35 are rocked forward through a feeding stroke, as hereinbefore mentioned. During this stroke the paddles advance the fish mass wedged therebetween, longitudinally of the tunnel toward the measuring and canning mechanism 17. At the end of this stroke, the paddles are withdrawn from the tunnel into their retracted normal position within the tumbler and the tumbler thereupon moves back through its return stroke. This returns the paddles to their original position for a subsequent feeding action. This completes the feeding cycle of the paddles. It is in this manner that the fish pieces are rapidly and gently advanced through the tunnel without in any way injuring them.

In the modified form of the invention illustrated in Figs. 4, 5, 6 and 7, the wedging action against the fish mass in the tunnel 11 to advance it forward into the measuring and canning mechanism 17 is brought about by a slightly wedge shaped paddle 51 and a similar cooperating pivotally mounted paddle 52. These paddles are mounted in an oscillatory tumbler 53 which is similar to the tumbler 35 of the preferred form of the invention.

The tumbler 53 like the tumbler 35 is formed with a pair of trunnions 56 carried in bearings 57 in a pair of support legs 58 which extend out from the tunnel floor 12 and its roof 13. The tumbler is disposed adjacent the tunnel 11 and is formed with a curved outer wall section 61 which slidably engages against a curved seat 62 formed in the tunnel side wall 15 and surrounding the opening 19 therein.

The tumbler 53 is oscillated in its seat 62 through a forward or feeding stroke and thence through a return stroke by a lever arm 63 which is mounted on one of the tumbler trunnions 56. Actuation of the lever arm is effected in any suitable manner in time with the other moving parts of the machine, preferably as disclosed in the above mentioned Rooney patent.

The paddle 51 is slidably disposed in a clearance slot 65 (Fig. 5) formed in the curved wall section 61 of the tumbler 53. Within the tumbler the paddle is formed with a slide 66 which operates in a radial slideway 67 (see Figs. 4, 5 and 7) in the tumbler. The slideway retains the slide in place in the tumbler. The slide is actuated for inserting the paddle into the tunnel 11 through its opening 19 and for withdrawing it therefrom in any suitable manner by way of a link 68 pivotally connected to the lower end of the slide, preferably as disclosed in the Rooney patent above mentioned.

The paddle 52 is disposed directly opposite the paddle 51 in spaced and parallel relation thereto, as best shown in Figs. 5 and 6, and is hingedly connected to the slide 66 for movement toward the paddle 51 by way of a pivot pin 71 carried in lugs 72 formed in the slide. A compression spring 73 interposed between the paddles maintains them in their separated relation.

This paddle 52 extends up through a side clearance opening 74 in the outer curved wall section 61 of the tumbler. This opening is covered by a slide plate 75 through which the paddle extends and which is disposed in a transverse slideway 76 formed in the curved wall section 61 to prevent the escape of fish from the tunnel. The outer surface of the paddle is formed with a curved tapered cam 78 (Fig. 7) which is engaged periodically by a roller 79 mounted on a stationary pivot pin 81 secured in the adjacent support leg 58 of the tunnel.

Normally the paddles 51, 52 are in a retracted position within the tumbler 53, the inner ends of the paddles being disposed just inside the outer periphery of the curved wall section 61 of the tumbler. In operation, the paddles are projected inwardly simultaneously into the tunnel 11 while the tumbler remains stationary in its position at the left hand end of the tunnel opening 19, as shown in Fig. 4.

The inwardly moving paddles travel in parallelism along a pair of shallow notches or recesses 77 formed in the inner surfaces of the floor 12 and roof 13 of the tunnel and thus push their way between the tunnel walls and the fish mass in the tunnel. The fish mass is thus disposed between the paddles, as in the preferred form of the invention hereinbefore explained. This inward travel of the paddles also brings the cam 78 on the paddle 52 into operable alignment with the roller 79.

While the paddles 51, 52 are in this position within the tunnel, the tumbler 53 rocks through its forward stroke, carrying the paddles with it. During the first portion of this stroke, the cam 78, rides against the roller 79 and hinges the paddle 52 inwardly against the side of the fish mass so that the paddle 52 is disposed at an angle to the paddle 51 and thus compresses the fish and wedges it against the opposite paddle 51, the innermost position of the hinged paddle 52 being shown in dot and dash lines in Figs. 5 and 6.

The cam 78 holds the hinged paddle 52 in this position during the remaining major portion of the forward stroke of the tumbler and thus advances the wedged fish mass through the tunnel toward the measuring and canning mechanism 17. The inner surface of the roof or ceiling 13 of the tunnel adjacent the hinged paddle 52 is tapered inwardly for the distance the paddle travels, so that the tunnel is narrower at the discharge end than at the feed-in end, to facilitate compression of the fish pieces as they advance through the tunnel.

At the end of this forward or feeding stroke, i. e., when the tumbler has rocked its full extent toward the right in Fig. 4, as indicated by the dot and dash position of the paddle 52 in that figure, both paddles are withdrawn from the tunnel into their retracted normal positions within the tumbler. At the very beginning of this outer movement of the paddles, the cam 78 slips off the roller 79 and this permits the spring 73 to force the paddle 52 outwardly away from the fish mass into engagement with the inner surface of the tunnel roof 13 to relieve the wedging pressure on the fish and to facilitate removal of the paddles.

The tumbler 53 thereupon rocks back through its return stroke to return the paddles to their original position for a subsequent feeding action. This completes the feeding cycle of the paddles. Thus it will be seen that this modified form of the invention provides a wedging action against the fish mass which is similar to the preferred form so that rapid and gentle feeding of the fish through the tunnel may be effected without injury to the fish.

The second modified form of the invention illustrated in Figs. 8, 9, 10 and 11 is generally similar to the other two forms but differs therefrom in that the wedging action against the fish mass in the tunnel 11 to advance it into the measuring and canning mechanism 17 is brought about by a paddle 91 and a cooperating rotatable paddle 92. These paddles are mounted in an oscillatory tumbler 93 which is similar to the tumblers 35, 53 hereinbefore mentioned.

The tumbler 93 like the tumblers 35, 53 is formed with a pair of trunnions 94 carried in bearings 95 in a pair of support legs 96 which extend out from the tunnel floor 12 and from its roof 13. The tumbler is formed with a curved outer wall section 97 which slidably engages against a curved seat 98 formed in the tunnel side wall 15 and surrounding the opening 19 therein.

The tumbler 93 is oscillated in its seat 98 through a forward or feeding stroke and thence through a return stroke by a lever arm 99 which is mounted on one of the tumbler trunnions 94. Actuation of the lever arm is effected in any suitable manner in time with the other moving parts of the machine, preferably as disclosed in the above mentioned Rooney patent.

The paddle 91 is slidably disposed in a clearance slot 101 (Fig. 9) in the curved wall section 97 of the tumbler 93. Within the tumbler the paddle is formed with a slide 102 which operates in a radial slideway 103 in the tumbler. The slideway retains the slide in place in the tumbler. The slide is actuated for inserting the paddle into the tunnel 11 through its opening 19 and for withdrawing it therefrom in any suitable manner by way of a link 104 pivotally connected to the lower end of the slide, preferably as disclosed in the Rooney patent above mentioned.

The rotatable paddle 92 is disposed directly opposite the paddle 91 and normally in spaced and parallel relation thereto as best shown in Figs. 9 and 10 and is secured at its outer end in a radially disposed pivot pin 108, the outer end of which is rotatably seated in a socket 109 formed in the slide 102. A setscrew 111 threadedly engaged in the slide extends into an annular groove 112 in the pivot pin and thus maintains the pin in its socket while permitting free rotation thereof relative to the fixed paddle 91.

The rotatable paddle 92 extends through a triangular shaped clearance opening 115 (see Figs. 8, 9 and 10) in the outer curved wall section 97 of the tumbler. This opening is covered to prevent the escape of fish from the tunnel 11 by a floating block 116 which is interposed between a flat inner surface 117 of the curved wall section of the tumbler and a support lug 118 which projects from a side of the tumbler. This support lug surrounds the inner end of the pivot pin 108 and is partially cut away, as shown in Fig. 10, to permit oscillation of the paddle 92. The plate 116 is formed with a clearance slot 121 for the paddle 92 but this slot is just big enough to permit free sliding movement of the paddle therethrough.

The floating block 116 besides serving as a barrier against the escape of fish from the tunnel 11 as mentioned above, is also utilized to oscillate the rotatable paddle 92 through its slotted connection with the plate. For this purpose the block 116 is provided with an off-center universal joint 122 having connection with an actuating rod 123. The rod extends through aligned openings 124, 125 formed respectively in the tumbler 93 and in its adjacent support leg 96, and is reciprocated in any suitable manner in time with the other moving parts of the machine.

Normally the flat sides of the paddles 91, 92 are in parallelism, as best shown in Fig. 10 in full lines and the paddles are in a retracted position within the tumbler 93, the inner ends of the paddles being disposed just inside the outer periphery of the curved wall section 97 of the tumbler. In operation, the paddles are projected inwardly simultaneously into the tunnel 11 while the tumbler remains stationary in its position at the left hand end of the tunnel opening 19, as shown in Fig. 8.

The inwardly moving paddles travel in parallelism with their outer flat surfaces moving along the inner surfaces of the floor 12 and roof 13 of the tunnel and thus push their way between the tunnel walls and the fish mass in the tunnel. The fish mass is thus disposed between the paddles as in the preferred and first modified forms of the invention hereinbefore explained. When the paddles are fully in the tunnel, the actuating rod 123 pushes inwardly against the floating block 116 and this rocks the rotatable paddle 92 with its pivot pin 108 from its horizontal position shown in Fig. 10 to the inclined position shown in dot and dash lines in that figure. One edge of the paddle remains adjacent the inner surface of the roof 13 of the tunnel while the opposite edge compresses and wedges the fish mass against the fixed paddle 91.

While the rotatable paddle 92 is in this shifted wedging position within the tunnel, the tumbler 93 rocks through its forward stroke carrying therewith the paddles and the fish mass wedged therebetween. It is this movement of the tumbler that advances the fish mass through the tunnel toward the measuring and canning mechanism 17.

At the end of this feeding stroke of the tumbler 93, both paddles 91, 92 are withdrawn simultaneously from the tunnel into their retracted normal position within the tumbler, the rotatable paddle 92 being oscillated back into its flat position against the tunnel roof 13 by the outward movement of the actuating rod 123 as this paddle moves into the tumbler. When the paddles are in their fully retracted position within the tumbler, the latter moves back through its return stroke to return the paddles to their original position for a subsequent action. This completes the feeding cycle of the paddles. Thus it will be seen that this second modified form of the invention also provides a wedging action against the fish mass which is similar to the preferred form and the first modified form so that rapid and gentle feeding of the fish through the tunnel can be effected without injury to the fish.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a fish canning machine, the combination of a fish mass supply tunnel having an elongated opening in a wall thereof, a pair of oppositely disposed spaced paddles movably mounted adjacent said opening on the exterior of the tunnel, reciprocable means connected to the outer ends of said paddles for projecting the latter through said opening into said tunnel to engage with a wedging action opposite sides of the mass of fish therein, and means for moving said projected pair of paddles longitudinally of and relative to said elongated tunnel wall opening for advancing the fish mass engaged between said paddles through the tunnel.

2. The combination defined in claim 1, wherein said paddles are of oppositely tapered cross section to facilitate the described wedging engagement of the paddles against opposite sides of the fish mass when the paddles are projected into and moved relative to the tunnel opening.

3. In a fish canning machine, the combination of a fish storage and supply tunnel having an opening therein, an oscillatory tumbler disposed adjacent said tunnel opening for sealing it against the escape of fish therethrough, a pair of spaced paddles movably mounted on said tumbler, reciprocable means connected to said paddles for inserting the paddles through said opening into said tunnel on opposite sides of the mass of fish therein with a wedging action against opposite sides of the fish to wedge the fish between said paddles, and means for rocking said tumber and said pair of paddles relative to said tunnel opening while the paddles are inserted into the tunnel for advancing the wedged fish through said tunnel.

4. In a fish canning machine, the combination of a fish storage and supply tunnel having an opening therein, an oscillatory tumbler disposed adjacent said tunnel opening for sealing it against the escape of fish therethrough, a pair of spaced paddles of wedge shape in cross section movably mounted on said tumbler, reciprocable means connected to said paddles for inserting the paddles through said opening into said tunnel to respectively engage against opposite sides of the mass of fish therein to wedge the fish between the paddles, and means for rocking said tumbler and said pair of paddles relative to said tunnel opening while the paddles are inserted into the tunnel for advancing the wedged fish through said tunnel.

5. In a fish canning machine, the combination of a fish storage and supply tunnel having an opening therein, an oscillatory tumbler disposed adjacent said tunnel opening for sealing it against the escape of fish therethrough, a pair of spaced paddles movably mounted on said tumbler, reciprocable means connected to said paddles for inserting the paddles through said opening into said tunnel on opposite sides of the mass of fish therein, means for oscillating said tumbler and said paddles relative to said tunnel opening while the paddles are in the tunnel to advance the fish therebetween through the tunnel, and means for moving one of said paddles toward the other to wedge the fish therebetween during advancement of the fish with the paddles through said tunnel.

6. In a fish canning machine, the combination of a fish storage and supply tunnel having an opening therein, an oscillatory tumbler disposed adjacent said tunnel opening for sealing it against the escape of fish therethrough, a pair of spaced paddles movably mounted on said tumbler, reciprocable means connected to said paddles for inserting the paddles through said opening into said tunnel on opposite sides of the mass of fish therein, means for rocking said tumbler and its supported paddles relative to said tunnel opening while the paddles are in the tunnel to advance the fish therebetween through the tunnel, and means for pivotally moving one of said paddles relative to the other during rocking movement of the tumbler to wedge the fish therebetween during advancement of the fish with the paddles through said tunnel.

7. In a fish canning machine, the combination of a fish storage and supply tunnel having an opening therein, an oscillatory tumbler disposed adjacent said tunnel opening for sealing it against the escape of fish therethrough, a pair of spaced wedge shaped paddles movably mounted on said tumbler, one of said paddles being mounted for hinging movement relative to the other, reciprocable means connected to said paddles for projecting said paddles into said tunnel on opposite sides of the mass of fish therein and for withdrawing said paddles from the tunnel, means for oscillating said tumbler and said paddles relative to said tunnel opening while the paddles are projected into the tunnel, and means for shifting said hingeably mounted paddle toward the other paddle of the pair to wedge the fish mass therebetween and advance the fish mass with the paddles through said tunnel.

8. In a fish canning machine, the combination of a fish storage and supply tunnel having an opening therein, an oscillatory tumbler disposed adjacent said tunnel opening for sealing it against escape of fish therethrough, a slide member carried in said tumbler, a fixed paddle on said slide member, a movable paddle also on said slide member in spaced relation to said fixed paddle, reciprocable means connected to said paddles for projecting the paddles into said tunnel on opposite sides of the mass of fish therein, means for shifting the movable paddle on said slide member relative to said fixed paddle while in projected position in said tunnel to wedge a portion of the fish mass between said paddles, and means for rocking said tumbler adjacent said tunnel opening while the paddles are projected into the tunnel for advancing the wedged fish through said tunnel.

9. In a fish canning machine, the combination of a fish supply and storage tunnel having an opening in a side wall thereof, an oscillatory tumbler disposed adjacent said tunnel opening, a pair of spaced substantially coextensive flat paddles mounted on said tumbler for sliding movement relative thereto, reciprocating means for projecting said paddles relative to the tumbler through said opening into said tunnel and for withdrawing the paddles therefrom, said paddles when in projected position being disposed between the fish in the tunnel and opposite tunnel walls with the flat sides of the paddles disposed parallel with and closely adjacent said side walls, means for oscillating said tumbler through a forward movement to advance the projected paddles through said tunnel and thence through a reverse movement after the paddles have been retracted from said tunnel by said reciprocating means to return said tumbler to its original position, cam means for shifting one of said paddles toward the other during the forward movement of said tumbler to wedge the fish between them to carry the fish forward through the tunnel, and spring means for returning the shifted paddle to its original position to release and clear the fish during withdrawal of the paddle from the tunnel and its return with the tumbler.

10. In a fish canning machine, the combination of a fish supply and storage tunnel having an opening in a side wall thereof, an oscillatory tumbler disposed adjacent said tunnel, a pair of spaced flat paddles slidably mounted on said tumbler, reciprocable means for projecting said paddles through said opening into said tunnel and into between the fish in the tunnel and opposite tunnel walls with the flat sides of the paddles disposed parallel with and closely adjacent said walls, means for rotating one of said paddles to wedge the fish between the paddles, and means for oscillating said tumbler through a forward movement to carry the paddles and the fish wedged therebetween through said tunnel and thence through a return movement after the fish is fully advanced, said paddle rotating means being further operative to return said rotatable paddle to its original position at the end of the forward movement of the tumbler, and said reciprocable means being operative to withdraw the paddles relative to the tumbler so that the paddles will clear the fish on the return movement thereof relative to said tunnel opening.

11. In a fish canning machine, the combination of a fish storage and supply tunnel having an opening therein, an oscillatory tumbler disposed adjacent said tunnel opening for sealing it against escape of fish therethrough, a slide member movably mounted on said tumbler, a fixed paddle carried by said slide member, a pivot pin also carried by said slide member in spaced relation and parallel to said fixed paddle, a rotatable paddle disposed parallel to said fixed paddle, and secured to said pivot pin for rotation therewith, means for projecting said paddles through said opening into said tunnel on opposite sides of the mass of fish therein and for withdrawing the paddles from the tunnel, means for rotating the rotatable paddle and its pivot pin relative to said fixed paddle while the paddles are in projected position within said tunnel to wedge the fish between said paddles, and means for rocking said tumbler adjacent said tunnel opening while the paddles are in the tunnel for advancing the wedged fish through said tunnel.

12. In a fish canning machine, the combination of a tapered wedge shaped tunnel for fish storage and supply, said tunnel having an opening in a wall thereof and also having a larger cross-sectional area at its feed-in end than at its discharge and for compressing the fish mass moving therethrough, a pair of oppositely disposed spaced paddles insertable into said tunnel through said opening and engageable against opposite sides of the fish therein for advancing the fish through the tunnel, means for projecting said paddles into said tunnel, and means for moving said projected paddles longitudinally of the tunnel for the purpose described.

13. In a fish canning machine, the combination of a tunnel for fish storage and supply, said tunnel having a pair of recesses formed in opposing walls thereof, a pair of oppositely disposed spaced paddles insertable into the recesses in said tunnel walls for engaging against opposite surfaces of the fish therein for advancing the fish through the tunnel, means for projecting said paddles into said tunnel, and means for moving said projected paddles longitudinally of the tunnel for the purpose described.

CARL G. PREIS.

REFERENCES CITED

The following references are of record in the file of this patent:

UNITED STATES PATENTS

| Number | Name | Date |
|---|---|---|
| 776,330 | Johnson | Nov. 29, 1904 |
| 1,219,900 | Alvey | Mar. 20, 1917 |
| 1,560,373 | Birnstock | Nov. 3, 1925 |
| 1,573,842 | Manning | Feb. 23, 1926 |
| 2,015,089 | Rooney | Sept. 24, 1935 |
| 2,037,724 | Jacobs et al. | Apr. 21, 1936 |
| 2,189,831 | Paynter et al. | Feb. 13, 1940 |
| 2,422,198 | Jacob | June 17, 1947 |